April 19, 1927.

C. E. PACKARD

DUMP BODY VEHICLE

Filed March 10, 1926

1,625,496

Inventor
C. E. Packard,

By Clarence A. O'Brien

Attorney

Patented Apr. 19, 1927.

1,625,496

UNITED STATES PATENT OFFICE.

CLARENCE E. PACKARD, OF ABILENE, KANSAS.

DUMP-BODY VEHICLE.

Application filed March 10, 1926. Serial No. 93,657.

My present invention has to do with dump body vehicles, and more particularly to means for detachably securing the body in carrying position upon a chassis and for facilitating the release of the forward end of the body when it is desired for the body to swing to dumping position.

The general object of my said invention is the provision of peculiar and advantageous manually operable means for detachably securing the forward end of the body down upon and to the chassis.

To the attainment of the foregoing, the invention consists in the improvement as hereinafter described and definitely claimed.

In the accompanying drawings, forming part of this specification:—

Similar numerals of reference designate corresponding parts in both views of the drawings.

I show at 1 chassis bars in parallelism said chassis bars being of the well known channel type, but the invention also applies to solid chassis bars. I also show a dump body 2 which per se may be of the construction illustrated or of any other construction compatible with the purpose of my invention.

The said dump body 2 is hingedly connected at 3 to the rear ends of the chassis bars 1 in conventional or any other appropriate manner to permit of the body 2 being dumped or arranged in inclined position at the rear ends of the chassis bars 1 and moved back to the horizontal position illustrated with its forward portion superposed upon the rear portion of the chassis bars 1.

Figure 1:
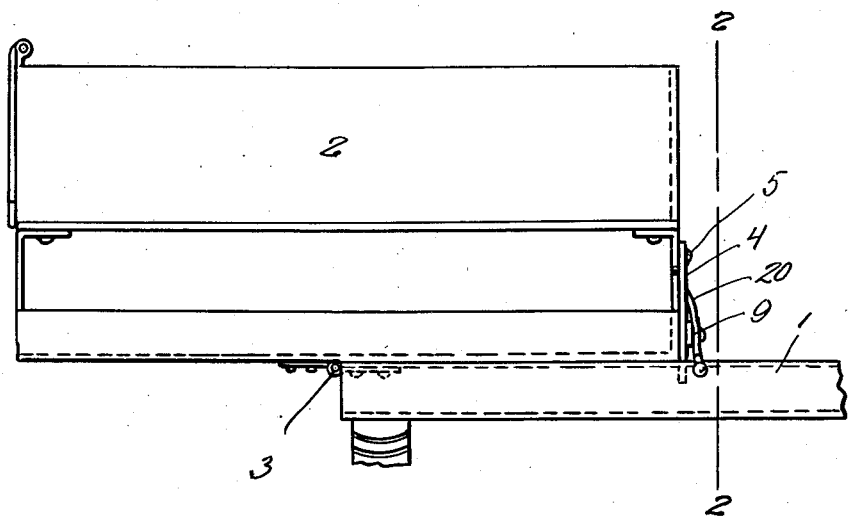
Figure 1 is a side elevation showing so much of a dump body vehicle as is necessary to illustrate the application of the preferred embodiment of my invention.
Figure 2:
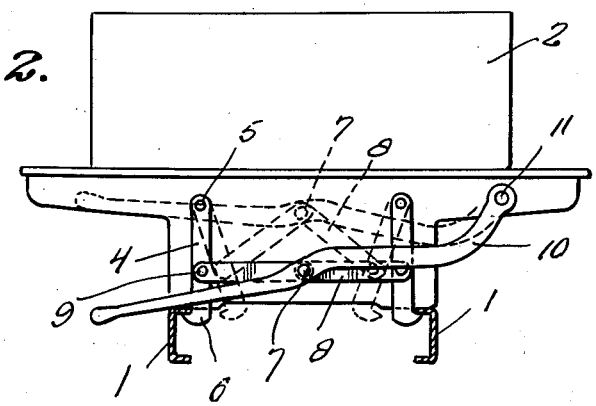
Figure 2 is a vertical transverse section taken in the plane indicated by the line 2—2 of Figure 1, looking rearwardly.

In accordance with my invention transversely swingable latch bars 4 are pivotally connected at 5 to the forward portion of the body 2 and arranged to swing crosswise of the vehicle. The said latch bars 4 are provided at their lower ends with outwardly directed hooks 6. Said hooks 6 are adapted to be moved into and out of engagement with the upper or lower flanges of the chassis bars 1, after the manner illustrated by full lines and dotted lines, respectively, in Figure 2. Pivotally connected together at 7 are links 8, the outer ends of which are pivotally connected at 9 to intermediate portions of the latch bars 4. The pintle employed in the pivotal connection 7 is also employed, by preference, in the pivotal connection of the links 8 to the intermediate portion of a hand lever 10, the said lever 10 being pivotally connected at 11 to the front end of the body 2, and being arranged transversely of the vehicle and so that its handle portion extends laterally outward beyond one of the chassis bars 1, as appears at the left of Figure 2. As will be readily understood from the full lines in Figure 2, the pivot connection of the links 8 rest about 1½ inches below dead center when the hook ends 6 of the latch bars 4 are in engagement with the upper flanges of the chassis bars 1, and hence the latch bars 4 will serve to strongly hold the forward end of the body 2 down upon the chassis bars 1 and without liability of the forward end of the body 2 being casually disconnected or released from the chassis bars 1. When, however, the lever 10 is swung upwardly into the dotted line position shown in Figure 2, it will be manifest that the position of rest below dead center will be broken, the pivot connection 7 of the links will be raised, and the latches 4 will be strongly drawn inwardly and disengaged from the upper flanges of the chassis bars 1, whereupon the body may be dumped in the ordinary well known manner. Again it will be understood that when the body 2 is restored to the position shown in Figure 1, and through the medium of the lever 10 the parts of the latch mechanism are moved from the dotted line positions shown in Figure 2 to the full line positions of said figure, the forward end of the body 2 will be strongly and securely connected to the chassis bars 1 so as to preclude the practicability of the body 2 being accidentally dumped in transit.

In addition to the practical advantages hereinbefore ascribed to my improvement, it will be appreciated that the improvement is simple and inexpensive in construction, is susceptible of easy operation and is reliable in use, and as a whole is well adapted to withstand the usage to which the appurtenances of dump body vehicles are ordinarily subjected.

I have specifically described the construction constituting the best practical embodiment of my invention of which I am aware in order to impart a full, clear and exact understanding of the said embodiment. I do not desire, however, to be understood as limiting myself to the precise structure and relative arrangement of elements, my invention being defined by my appended claim within the scope of which modifications may be made without departure from my invention.

Having described my invention, what I claim and desire to secure by Letters Patent, is:—

In a dump body vehicle, and in combination, chassis bars in parallelism and channel formed in vertical section, a dump body hingedly connected with said chassis bars, and means for detachably connecting the forward portion of the body to said chassis bars; said means comprising transversely swingable latch bars pivotally connected to the forward portion of the body and having outwardly directed hooks to engage the upper flanges of the chassis bars, links pivotally connected together and pivotally connected to said latch bars intermediate their ends, and a transverse vertically swingable lever pivotally connected at one end to the front portion of the body above the pivots of the links with the latch bars and pivotally connected at an intermediate point in its length to the pivotal connection between the links, the distance between the pivots of the lever being such as to allow the pivotal connection between the links to be disposed below the connection of the links with the latch bars when the latch bars are engaged with the flanges of the chassis bars.

In testimony whereof I affix my signature.

CLARENCE E. PACKARD.